United States Patent [19]
Aoki

[11] Patent Number: 5,721,641
[45] Date of Patent: Feb. 24, 1998

[54] ZOOM LENS CAPABLE OF CORRECTING IMAGE POSITION MOVEMENT

[75] Inventor: Masayuki Aoki, Tochigi-ken, Japan

[73] Assignee: Nikon Corporation, Tokyo, Japan

[21] Appl. No.: 452,648

[22] Filed: May 25, 1995

[30] Foreign Application Priority Data

Jul. 18, 1994 [JP] Japan ................... 6-187769

[51] Int. Cl.$^6$ ................... G02B 27/64; G02B 15/14
[52] U.S. Cl. ................... 359/557; 359/554; 359/686; 359/688
[58] Field of Search ................... 359/554–557, 359/676–677, 683–688

[56] References Cited

U.S. PATENT DOCUMENTS

| | | | |
|---|---|---|---|
| 4,634,237 | 1/1987 | Aono et al. | 359/688 |
| 4,832,431 | 5/1989 | Nolting et al. | 385/2 |
| 4,832,471 | 5/1989 | Hamano | 359/676 |
| 4,844,602 | 7/1989 | Kitagishi et al. | 359/557 |
| 4,907,868 | 3/1990 | Kigaghishi et al. | 359/557 |
| 5,040,881 | 8/1991 | Tsuji | 359/557 |
| 5,249,079 | 9/1993 | Umeda | 359/557 |
| 5,477,297 | 12/1995 | Suzuki | 354/195.1 |
| 5,502,594 | 3/1996 | Suzuki et al. | 359/557 |

FOREIGN PATENT DOCUMENTS

| | | | |
|---|---|---|---|
| 60-91774 | 5/1985 | Japan. | |
| 1-284823 | 11/1989 | Japan. | |
| 1-284824 | 11/1989 | Japan. | |
| 1-284825 | 11/1989 | Japan. | |
| 7-27978 | 1/1995 | Japan. | |
| 6-130330 | 5/1996 | Japan | 359/557 |

*Primary Examiner*—Thong Nguyen
*Attorney, Agent, or Firm*—Oliff & Berridge, PLC

[57] ABSTRACT

A zoom lens has the capability to maintain image quality during image shifting for correcting for movement of the zoom lens. The zoom lens comprises, in order from the object side, a first lens group having positive refractive power, a second lens group having negative refractive power, a third lens group having negative refractive power, and a fourth lens group having positive refractive power. When changing magnification, the first lens group and the fourth lens group remain stationary along the optical axis and the second lens group and the third lens group move along the optical axis. The fourth lens group comprises, in order from the object side, a front lens group and a rear lens group. The front lens group of the fourth lens group moves in a direction substantially perpendicular to the optical axis to correct for movement of the image position caused by movement of the zoom lens.

20 Claims, 14 Drawing Sheets

ZOOM LENS CAPABLE OF CORRECTING IMAGE POSITION MOVEMENT

FIELD OF THE INVENTION

The present invention relates to a zoom lens, and, particular, to a zoom lens, that corrects for the movement of an image position.

BACKGROUND OF RELATED ART

An optical system is disclosed in Japanese Unexamined Patent Publications 1-284823, 2-284824, 1-284825 and U.S. Pat. No. 5,040,881. This conventional optical system corrects for image shifting ("shake-preventing") in a 5-group zoom lens by moving one or more lenses of one of the lens group in a direction perpendicular to the optical axis.

In this conventional 5-group zoom lens described above, the first lens group, which is closest to the object, moves in a direction perpendicular to the optical axis to correct for movement of the image position. However, in this conventional 5-group zoom lens, the first lens group includes heavy, large-diameter lenses. As a result, controlling the movement and driving of the first lens group is complicated and the control system is bulky.

SUMMARY OF THE INVENTION

This invention provides a zoom lens having a lens group that corrects for movement of the image position which is simply and uncomplicatedly driven.

This invention further provides for good image composition even during movement of the zoom lens.

In order to solve the above-mentioned problems, the zoom lens 100 of this invention comprises, in order from an object side to an image side of the zoom lens 100, a first lens group G1 having positive refractive power, a second lens group G2 having negative refractive power, a third lens group G3 having negative refractive power, and a fourth lens group G4 having positive refractive power. The lens groups G1–G4 are arranged in order along the optical axis from an object side, which is closest to the object to be photographed, to an image side, which is closest to an image plane of the camera. The first lens group G1 and the fourth lens group G4 remain stationary along the optical axis, and the second lens group G2 and the third lens group G3 move along the optical axis when changing the magnification from a wide-angle state of the zoom lens 100 to the telephoto state of the zoom lens 100.

The fourth lens group G4 comprises, in order from the object side to the image side, a front lens group G4F and a rear lens group G4R.

This invention further comprises a moving device that moves one or more of the lenses of the front lens group G4F of the fourth lens group G4 in a direction substantially perpendicular to the optical axis to correct for movement of the image position caused by movement of the zoom lens.

As described above, since the lenses within the first lens group G1 have large diameters and are heavy, when lens group G1 is the shifted lens group, the shift driving device is bulky and complicated and controlling the shifting movement of the front lens group G1 is difficult.

In addition, even though the lenses within the second lens group G2 are comparatively small and lightweight, the refractive power of the second lens group G2 is large. As a result, eccentric aberrations of each lens within the second lens group G2 are generated. Thus, the image quality of the zoom lens 100 is significantly decreased when lens group G2 is used as the shifted lens group. Moreover, since the second lens group G2 is moved along the optical axis when changing magnification, the shift driving mechanism is undesirably complex and bulky.

The third lens group G3 is also moved along the optical axis to change the magnification. In addition, the rear lens group G4R of the fourth lens group G4 is moved along the optical axis to adjust the focus for ultra-close photography. As a result, it is mechanically undesirable to drive the third lens group G3 or the rear lens group G4R of the fourth lens group G4 as the shifted lens group to correct for image shifting.

However, the front lens group G4F of the fourth lens group G4 remains stationary along the optical axis when both the magnification is changed and the focus is adjusted. In addition, the front lens group G4F is small and lightweight. Thus, if the front lens group G4F is the shifted lens group to correct for image shifting, the front lens group G4F is easily and uncomplicatedly driven in the direction substantially perpendicular to the optical axis.

Further, the front lens group G4F of the fourth lens group G4 converts the scattered light rays from the third lens group G3 into substantially parallel light rays. Thus, it is necessary to correct for various optical aberrations, such as spherical aberrations and the like. Additionally, generating eccentric aberrations during image shifting must be suppressed. Therefore, it is desirable to provide, in order from the object side, at least three positive lenses L41, L42, and L43 in the front lens group G4F of the fourth lens group G4.

In this instance, it is desirable to distribute the refractive power of the at least three positive lenses L41, L42, and L43, such that the refractive powers of at least the two lenses L41 and L43 is relatively smaller than the other lenses in the front lens group G4F. Furthermore, the refractive power of at least the lens L42 should be relatively larger than the refractive power of the other lenses in the front lens group G4F. Therefore, in order to comparatively reduce generating eccentric aberrations when correcting image shifting, it is desirable to move the lenses L41 or L43, which have relatively small refractive powers, in a direction perpendicular to the optical axis as the image shifting lenses.

These and other aspects and advantages of this invention are described or apparent from the following detailed description of the preferred embodiments.

BRIEF DESCRIPTION OF THE DRAWINGS

The preferred embodiments are described with reference to the drawings in which.

DETAILED DESCRIPTION OF PREFERRED EMBODIMENTS

Figure 1:
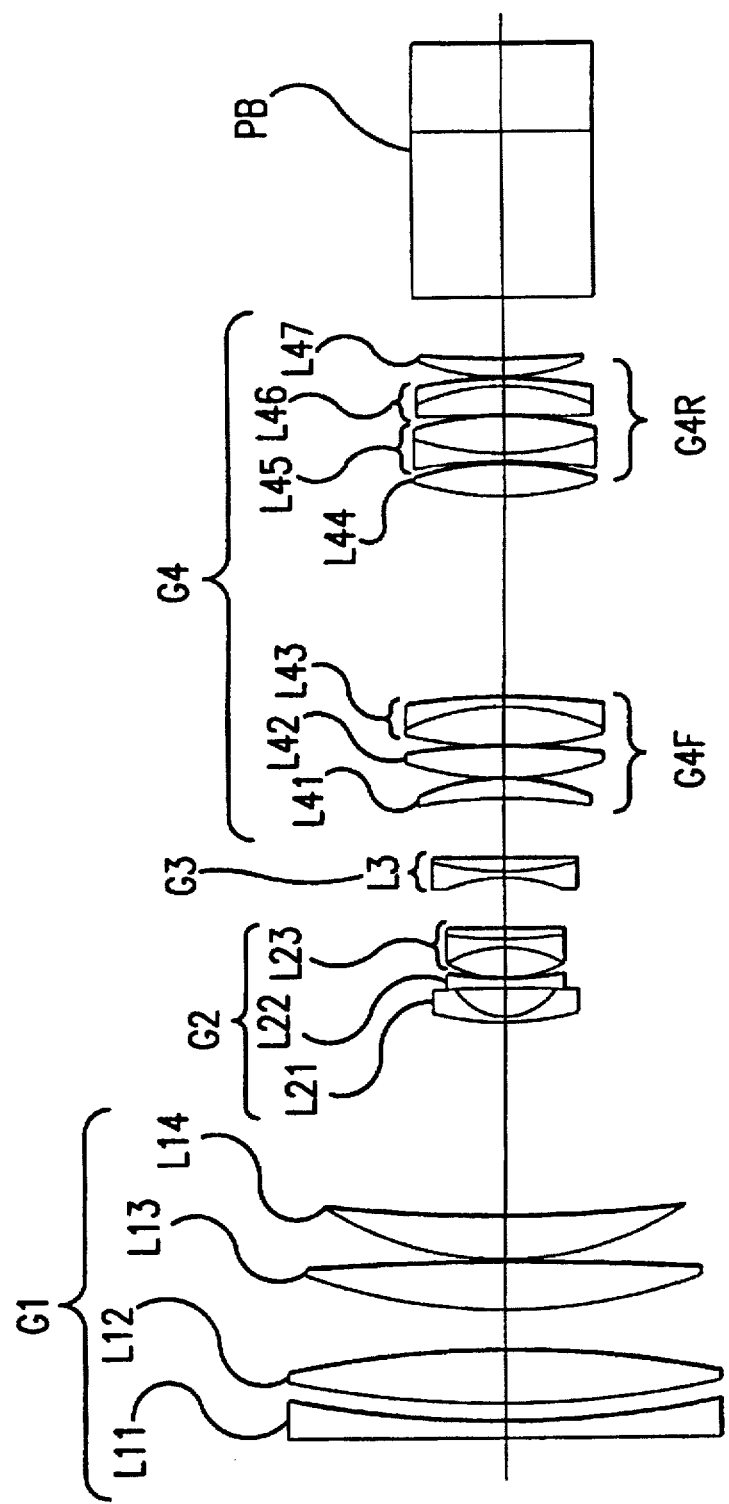
FIG. 1 shows a first preferred embodiment of a zoom lens according to this invention.

It is desirable to drive one or more of the lenses within the front lens group G4F of the fourth lens group G4 as the shifted lens or lenses. In particular, it is desirable to drive the lens L41 nearest the object side and/or the lens L43 nearest the image side as the image shifting lens or lenses. When either the lens L41 or the lens L43 moves in the direction perpendicular to the optical axis, the conditions to be satisfied to obtain suitable image quality during image shifting are shown in equations (1) and (2):

$$0.1 < f4F/f41 < 0.5 \tag{1}$$

$$0.1 < f4F/f43 < 0.5 \tag{2}$$

where:

f4F is the focal length of the front lens group G4F of the fourth lens group G4, f41 is the focal length of the lens L41, and f43 is the focal length of the lens L43.

Equations (1) and (2) establish the optimum refractive power, respectively, for using the lens L41 and using the lens L43 to correct image shifting. If the upper limits of equations (1) or (2) are exceeded, the refractive powers of the positive lenses L41 and L43, respectively, become too large. Thus, the image quality of the zoom lens 100 decreases due to an increase in noticeable eccentricity. Conversely, if the focal lengths are shorter than the lower limits of equations (1) or (2), the decrease in the image quality of the zoom lens due to eccentricity becomes less noticeable. However, these short focal lengths are undesirable because the required amount of lens movement in the direction perpendicular to the optical axis to correct for movement of the image position becomes excessively large.

The zoom lens 100 of this invention should also satisfy the condition shown in equation (3):

$$0.5 < (FT)^{1/2} \cdot f1/fT < 0.9 \tag{3}$$

where:

FT is the F-number when the zoom lens 100 is in the telephoto state, f1 is the focal length of the first lens group G1, and fT is the combined focal length of the zoom lens 100 when the zoom lens is in a telephoto state.

The zoom lens 100 is in a wide-angle state when the second lens group G2 and the third lens group G3 are located farthest apart along the optical axis. Conversely, the zoom lens 100 is in a telephoto state when the second lens group G2 and the third lens group G3 are closest to each other along the optical axis.

Equation (3) establishes the optimum refractive power of the lens groups that change magnification (the second and third lens groups G2 and G3) in order to decrease the size of the lens groups while maintaining the image quality of the zoom lens 100.

By using equation (3), the optimum power range may be set according to a zoom ratio and a maximum diameter ratio of the zoom lens 100. If the upper limit of equation (3) is exceeded, it becomes very difficult to achieve a reduction in the size of the lens group or groups that change magnification. Conversely, if the focal length is less than the lower limit of equation (3), the size of the lens group or groups that change magnification is effectively reduced, but the various aberrations that accompany the change in magnification become noticeably worse. In particular, spherical aberrations when the zoom lens 100 is in the telephoto state become difficult to correct for, since the decrease of the Petzval sum and the apparent F-number of the first lens group G1 becomes too small when the zoom lens 100 is in the telephoto state, due to the increase in refractive power of the second lens group G2 and the third lens group G3. Furthermore, these short focal lengths are not desirable, since manufacturing tolerances are tightened and the decrease in image quality due to the eccentricity of each lens becomes noticeable.

The zoom lens 100 of this invention should also satisfy the condition shown in equation (4):

$$0.9 < |\beta 2W \cdot V^{1/2}| < 1.3 \tag{4}$$

where:

β2W is the magnification of the second lens group G2 when the zoom lens 100 is in the wide-angle state, and V is the zoom ratio when the zoom lens 100 is in the wide-angle state.

Equation (4) properly maintains the Petzval sum of the zoom lens 100. The value of the Petzval sum corresponds to the curvature of the image. If the value of the Petzval sum is equal to 0, the image is flat. In other words, a non-zero value for the Petzval sum corresponds to a curved image. By using equation (4), the Petzval sum is prevented from becoming worse (i.e. farther from zero), because the refractive power of the second lens group G2 becomes comparatively small regardless of the size reduction of the lens group or groups that change magnification. In the positive-negative-negative-positive zoom lens 100 of this invention, the second lens group G2 is usually the most powerful lens group among all the lens groups G1–G4. Therefore, to maintain a proper value for the Petzval sum, it is most effective to decrease the negative power of the second lens group G2 as much as possible.

Figure 13:
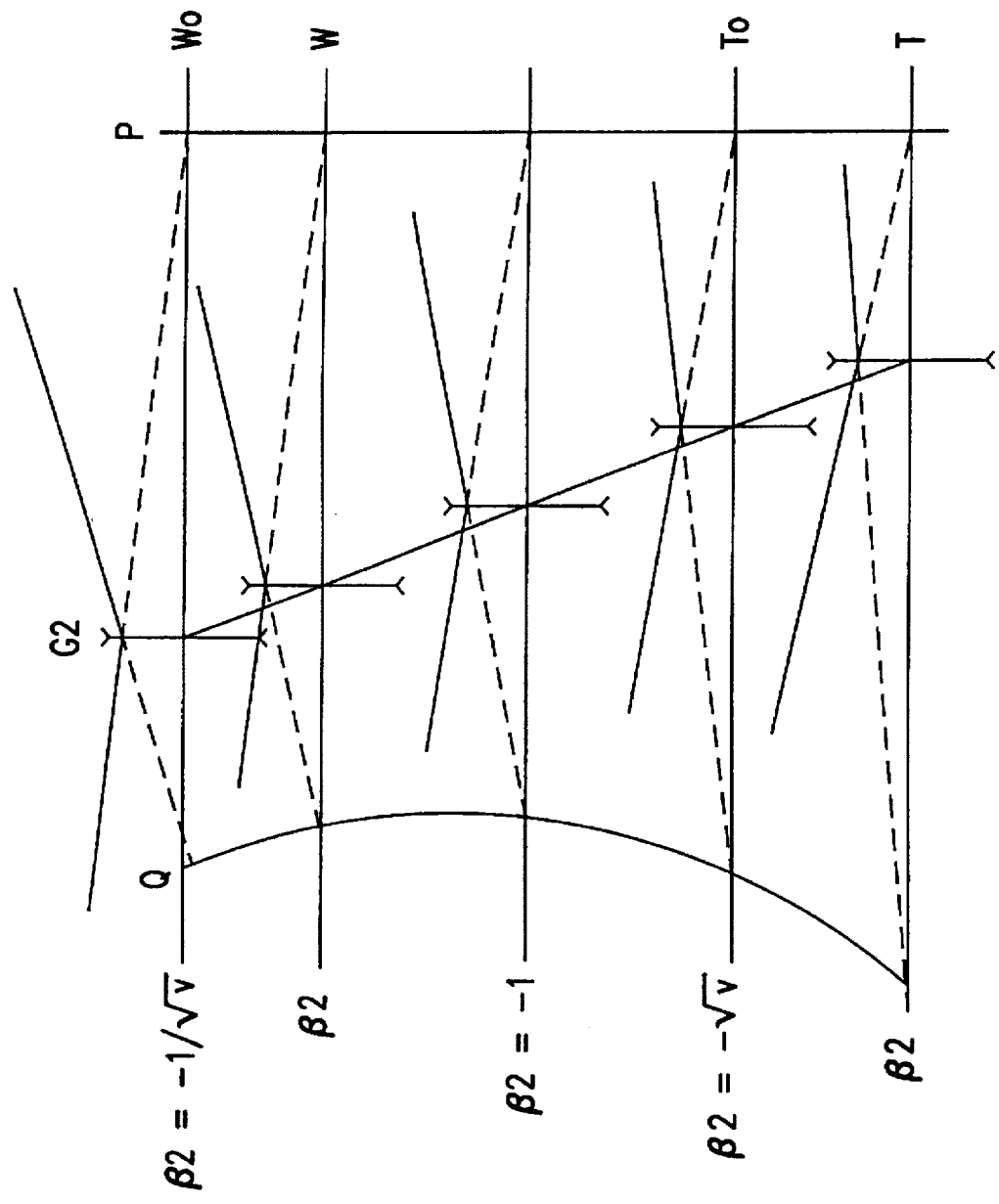
FIG. 13 symbolically shows the change in magnification through the second lens group G2.

FIG. 13 symbolically shows the change in magnification through the second lens group G2. In FIG. 13, P indicates the image position after having passed through the first lens group G1. In other words, P indicates the object position of the second lens group G2, and Q indicates the path of the image as it passes through the second lens group G2. When the change in magnification through the second lens group G2 is v and the standard focal length changing range is the range W0–T0, the magnification of the second lens group G2 becomes $-1/v^{1/2+\epsilon\epsilon}$ and $-v^{+\epsilon.fm\ 1/2}$, respectively, in the wide-angle state and telephoto state of the zoom lens 100. As shown in FIG. 13, when the standard magnification changing range is W0–T0, the position of the image path Q in the wide-angle state coincides with the telephoto state. Thus, when the standard magnification changing range is W0–T0, the change in magnification v of the second lens group G2 becomes the same as the zoom ratio V.

The relationship between the magnification of the second lens group G2 when the zoom lens 100 is in the wide-angle state, where G1 and G2 are closest, and the focal length of lens groups G1 and G2 is given by equation (5):

$$f2=(f1-\Delta)*\beta 2W/(1-\beta 2W) \qquad (5)$$

where:
 f1 is the focal length of the first lens group G1,
 f2 is the focal length of the second lens group G2,
 $\Delta$ is the space necessary to prevent the lens groups G1 and G2 from mechanically interfering, and
 $\beta 2W$ is the magnification of the second lens group G2 when the zoom lens 100 is in the wide-angle state.

Equation (5) shows that if the value of $\beta 2W$ is larger than the value of $-1/V^{1/2}$ in equation (4), then the absolute value of f2, |f2|, will increase and the power of the second lens group G2 will decrease. This corresponds to selecting the magnification changing range W–T, as shown in FIG. 13, rather than the standard magnification changing range W0–T0. When the magnification changing range of the second lens group G2 satisfies equation (4), the negative power of the second lens group G2 can be decreased. When the lower limit of equation (4) is not satisfied, the refractive power of the second lens group G2 increases and the Petzval sum becomes worse. Conversely, when the upper limit of equation (4) is exceeded, the space required for the change in magnification of the second lens group G2 increases. This causes an undesirable increase in the front cell diameter of the zoom lens 100. In addition, the ratio of the amount of movement when changing the magnification of the third lens group G3 relative to the second lens group G2 becomes extremely large when the zoom lens 100 is in the telephoto state, causing the driving regulation for moving both the lens groups G2 and G3 to become bulky.

In each of the first-third preferred embodiments of this invention, the zoom lens 100 comprises a first lens group G1 having positive refractive power, a second lens group G2 having negative refractive power, a third lens group G3 having negative refractive power, and a fourth lens group G4 having positive refractive power. As described above, when changing the magnification from a wide-angle state to a telephoto state, the first lens group G1 and the fourth lens group G4 remain stationary along the optical axis, while the second lens group G2 and third lens group G3 are moved along the optical axis. The fourth lens group G4 further comprises, a front lens group G4F and a rear lens group G4R.

In each of the first-third preferred embodiments of this invention, a moving device 200 is provided. The moving device 200 moves at least one lens of the front lens group G4F in a direction perpendicular to the optical axis. This perpendicular movement of at least one lens of the front lens group G4F corrects for movement of the image position caused by movement of the zoom lens 100.

Figure 14:
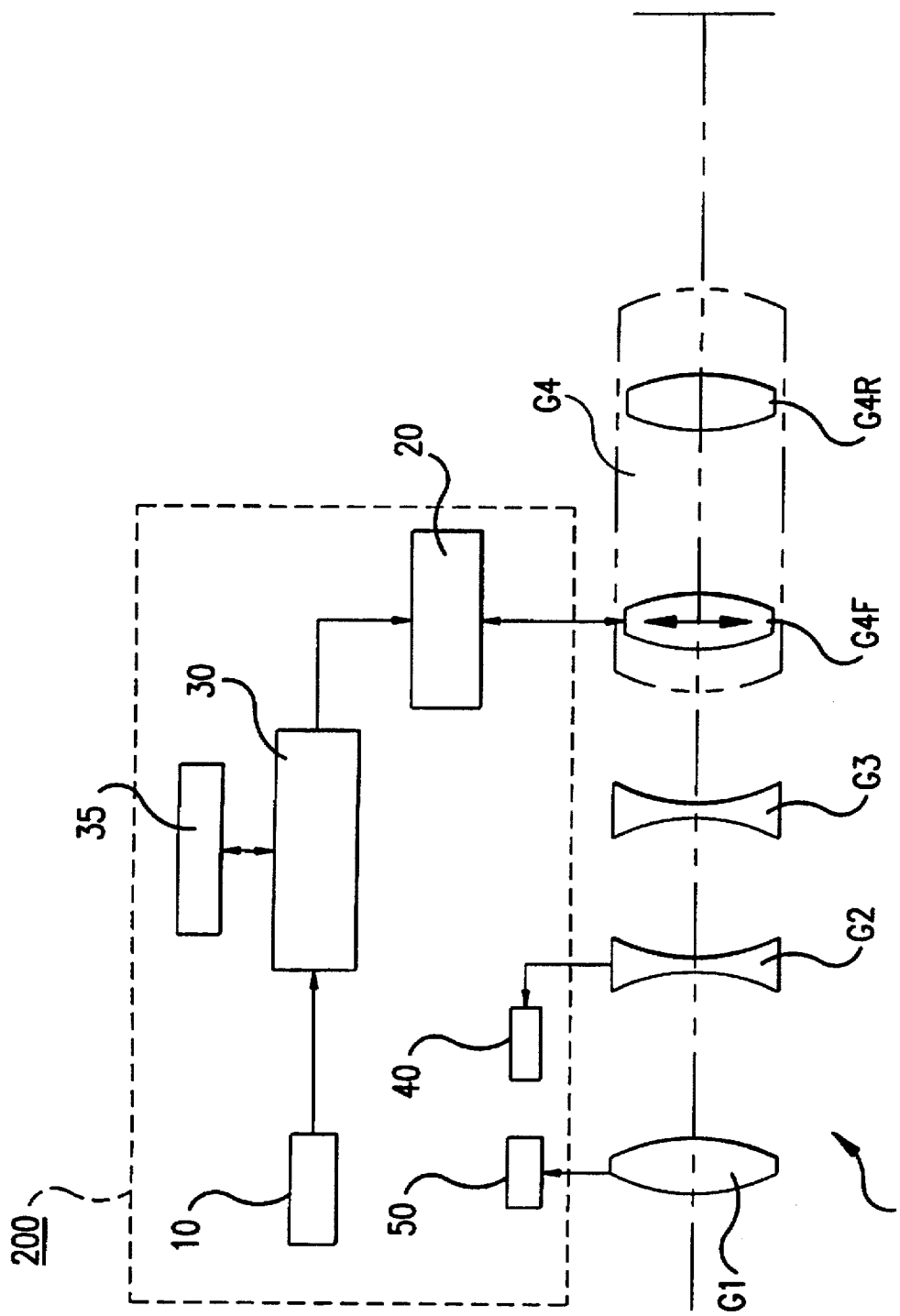
FIG. 14 shows a block diagram of the moving device.

FIG. 14 shows a block diagram of the moving device 200. The moving device 200 comprises a movement detection device 10 that detects movement of the zoom lens 100, a driving device 20 that drives the image shifting front lens group G4F in a direction substantially perpendicular to the optical axis, and a controller 30 that controls the driving device 20 based on output from the movement detection device 10.

The movement detection device 10 may be, for example, an angular velocity sensor, angular acceleration sensor, or the like. The driving device 20 may be, for example, a motor, a coreless motor, a piezoelectric element, or the like. An encoder (not shown) is provided in the driving device 20 to detect the position of the front group G4F in a direction substantially perpendicular to the optical axis. The output of this encoder is transmitted to the controller 30.

The controller 30 may be, for example, a programmed microcomputer or microcontroller or other microprocessor, an ASIC, a programmable logic array, or a dedicated hard-wired circuit. Furthermore, the controller 30 may be provided in the zoom lens 100 or in a camera (not shown) to which the zoom lens 100 is attached. In this case, the zoom lens 100 and camera will have the proper terminals to connect the controller 30 in the camera to the movement detection device 10 and the drive device 20 in the zoom lens 100. In addition, if the controller 30 is provided in the camera, it can be provided as part of a general controller of the camera or as an independent control element.

One type of known driving device 20, controller 30, and associated encoders and encoder 40 and/or 50 are shown in detail in U.S. patent application Ser. No. 08/216,283, incorporated herein by reference, which is assigned to the assignee of this invention.

In each of the first-third embodiments of this invention, the correction amount of the lens group, which corrects for a certain fixed angle of inclination, varies according to the focal length (or magnification) of the entire zoom lens 100. Thus, an encoder 40 detects the position of the second lens group G2 along the optical axis when changing the magnification. The encoder 40 may be, for example, a linear encoder, rotary encoder, or the like. When using a linear encoder, for example, as the encoder 40, the position along the optical axis of the second lens unit G2 is detected. Alternatively, the encoder 40 can detect the position of the support for the second lens group G2. Using a rotary encoder, for example, as the encoder 40, the angle of rotation of the component that rotates around the optical axis as the magnification is changed is detected. The rotary encoder may be, for example, a mirror tube or the like with a cam groove.

A ROM (Read Only Memory) 35 stores the relationship between the positions of the second lens group G2 in the direction along the optical axis and the corresponding correction amounts needed to drive lens group G4 in a first reference or look-up table. The controller 30 determines a correction amount based on the output of the encoder 40 and the first reference table stored in the ROM 35 and drives the lens group G4 based on the correction amount.

By determining the correction amount corresponding to the focal length of the entire zoom lens 100, this invention is not limited to detecting the position of the second lens group G2 along the optical axis. Instead, the encoder 40 can detect the position of the third lens group G3 along the optical axis. In addition, the encoder 40 can detect the position along the optical axis of more than one lens group.

In each of the first-third preferred embodiments of this invention, the correction amount of the image shifting lens varies according to the object distance. Thus, an encoder 50 detects the position one or more of the lens groups that move along the optical axis during focusing. The ROM 35 also stores a second reference table containing the relationship between the output of the encoder 50 and the correction amount of the lens group G4. The controller 30 determines a correction amount based on the output of the encoder 50 and the second reference table stored in the ROM 35 and drives the lens group G4 based on the correction amount.

As shown in FIG. 14, for example, the encoder 50 detects the position of the first lens group G1 along the optical axis. However, during rear focusing, the encoder 50 can detect the position of any lens group that moves along the optical axis.

In operation, the encoder 40 continuously detects the position of the second lens group G2 along the optical axis during movement of the zoom lens 100. The output from encoder 40 is transmitted to the controller 30. The encoder 50 also continuously detects the position of the first lens group G1 along the optical axis during movement of the zoom lens 100. The output from encoder 50 is also transmitted to the controller 30.

When the entire zoom lens 100 moves, due to hand shaking or the like, perpendicularly to the optical axis, an output signal from the movement detection device 10 is transmitted to the controller 30. As mentioned earlier, the output signal may be, for example, an angular velocity signal when the movement detection device 10 comprises an angular velocity sensor, or an angular acceleration signal when the movement detection device 10 comprises an angular acceleration sensor.

The controller 30 determines the correction amount of the lens group based on the output signal from the movement detection device 10 and the first reference table stored in the ROM 35. The controller 30 then receives the output from the encoder within the driving device 20, indicating the position of the lens group G4 along the optical axis, and controls the driving device 20 so that the lens group G4 is driven to the correction amount in the direction substantially perpendicular to the optical axis. That is, the lens group G4 is driven such that the output of the encoder within the driving device 20 coincides with the correction amount. Thus, the movement of the image position when the zoom lens moves perpendicularly due to hand shaking or the like can be corrected for.

In the example described above, an encoder is provided within the driving device 20 and detects the position of the image shifting lens perpendicularly to the optical axis. This encoder performs a so-called "closed loop" position control. However, if the driving device 20 comprises a stepping motor or the like, "open loop" control may be performed instead.

FIG. 1 shows the structure of a zoom lens according to the first preferred embodiment. As described above, the zoom lens 100 comprises a first lens group G1, a second lens group G2, a third lens group G3, and a fourth lens group G4.

The front lens group G1 comprises a biconcave lens L11, a biconvex lens L12, a biconvex lens L13, and a positive meniscus lens L14 having its convex surface on the object side. The second lens group G2 comprises a negative meniscus lens L21 having its convex surface on the object side, a biconcave lens L22, and a compound lens L23 comprising a biconvex lens, a biconcave lens, and a positive meniscus lens having its convex surface on the object side. The third lens group G3 comprises a compound lens L3 comprising a biconcave lens and a biconvex lens. The fourth lens group G4 comprises the front lens group G4F and the rear lens group G4R. The front lens group G4F comprises a positive meniscus lens L41 with a concave surface on the object side, a biconvex lens L42, and a positive compound lens L43 having a biconvex lens and a negative meniscus lens with a concave surface on the object side. The rear lens group G4R comprises a biconvex lens L44, a compound lens L45 comprising a biconcave lens and a biconvex lens, a compound lens L46 having its biconvex lens and a negative meniscus lens having its concave surface on the object side, and a positive meniscus lens L47 having its convex surface on the object side.

FIG. 1 shows the relative positions of the lens groups G1–G4R when the zoom lens 100 is in the wide-angle state. When the magnification of the zoom lens 100 is changed to place the zoom lens 100 in the telephoto state, the second lens group G2 is moved along the optical axis in a first direction, while the third lens group G3 is moved along the optical axis in the opposite direction. The positive meniscus lens L41, which is the positive lens of the front lens group G4F closest to the object side, or the positive compound lens L43, which is the positive lens group closest to the image side, is driven by the moving device 200 substantially perpendicularly to the optical axis to correct for movement of the image position caused by movement of the zoom lens 100 perpendicular to the optical axis.

The values of the parameters of the first preferred embodiment are displayed in Table 1. In Table 1, f is the focal length, FNo is the F-number, $2\omega$ is the field angle, the Surface Number is the lens surface number starting from the object side, r is the radius of curvature of each lens surface, d is the space between each pair of adjacent lens surfaces, and n and v show the refractive indices and Abbe's numbers for the d-line ($\lambda=587.6$ nm).

Non-spherical surfaces are defined by equation (6):

$$S(y)=(y^2/R)/[1+(1-k^*y^2/R^2)^{1/2}]+C_2{}^*y^2+C_4{}^*y^4+C_6{}^*y^6+C_8{}^*y^8+C_{10}{}^*y^{10}+\ldots \quad (6)$$

where:

y is the height in the direction perpendicular to the optical axis,

S(y) is the displacement along the optical axis at height y,

R is the standard radius of curvature, k is the conic coefficient, and $C_n$ is the n-dimensional non-spherical surface coefficient.

The radius of curvature, r, of the non-spherical surface at the short axis is defined by equation (7):

$$r=1/(2^*C_2+1/R) \quad (7)$$

The non-spherical surfaces in Table 1 are designated with an asterisk (*) to the right of the surface number.

As shown in FIG. 1, a prism block PB, that indicates a parallel surface plate with a color separating prism, various filters, or the like, is positioned between the last lens surface and the image plane. Since the aberration corrections include this prism block PB, the values of the items of the prism block PB are included in Table 1.

TABLE 1 f = 8.75–127 mm
FNO = 1.72–2.13
2ω = 64.30°–4.96°

(a)

| Surface Number | r | d | ν | n |
|---|---|---|---|---|
| 1 | –453.573 | 1.90 | 23.8 | 1.84666 |
| 2* | 169.447 | 2.82 | | |
| 3 | 174.470 | 9.40 | 95.0 | 1.43875 |
| 4 | –150.519 | 6.94 | | |
| 5 | 94.922 | 8.70 | 82.6 | 1.49782 |
| 6 | –441.788 | 0.10 | | |
| 7 | 58.543 | 7.40 | 52.3 | 1.74810 |
| 8 | 195.841 | (d8 is variable) | | |
| 9 | 60.562 | 0.90 | 35.8 | 1.90265 |
| 10 | 11.692 | 5.50 | | |
| 11* | –55.558 | 0.90 | 52.3 | 1.74810 |
| 12 | 42.524 | 0.10 | | |
| 13 | 20.282 | 6.20 | 30.8 | 1.61750 |
| 14 | –17.643 | 0.90 | 46.4 | 1.80411 |
| 15 | 41.633 | 2.40 | 23.0 | 1.86074 |
| 16 | 6504.092 | (d16 is variable) | | |
| 17 | –24.915 | 0.90 | 52.3 | 1.74810 |
| 18 | 54.346 | 2.70 | 23.0 | 1.86074 |
| 19 | –400.129 | (d19 is variable) | | |
| 20 | –68.073 | 3.60 | 65.8 | 1.46450 |
| 21 | –27.589 | 0.10 | | |
| 22 | 52.986 | 5.40 | 70.2 | 1.48749 |
| 23 | –88.727 | 0.10 | | |
| 24 | 65.278 | 7.10 | 56.5 | 1.50137 |
| 25 | –39.536 | 1.20 | 39.8 | 1.86994 |
| 26 | –175.382 | 36.30 | | |
| 27 | 45.758 | 6.00 | 65.8 | 1.46450 |
| 28 | –56.878 | 0.70 | | |
| 29 | –71.071 | 1.00 | 39.8 | 1.86994 |
| 30 | 32.743 | 7.30 | 70.2 | 1.48749 |
| 31 | –42.526 | 0.10 | | |
| 32 | 157.576 | 5.40 | 49.1 | 1.53172 |
| 33 | –29.546 | 1.00 | 39.8 | 1.86994 |
| 34 | –130.985 | 0.10 | | |
| 35 | 29.193 | 4.40 | 70.2 | 1.48749 |
| 36 | 396.494 | 10.00 | | |
| 37 | ∞ | 30.00 | 38.1 | 1.60342 |
| 38 | ∞ | 16.20 | 64.1 | 1.51680 |
| 39 | ∞ | 2.02 | | |

(b)
d vs. focal length for variable spacing

| | focal length (f) | | |
|---|---|---|---|
| d (Surface No.) | 8.75 | 40.00 | 127.00 |
| (8) | 0.8543 | 34.4666 | 45.6605 |
| (16) | 47.8103 | 9.2889 | 3.7487 |
| (19) | 5.0260 | 9.9351 | 4.2814 |

(c)
Non-spherical surface data

| | Surface Number | |
|---|---|---|
| | 2 | 11 |
| k | 0.0000 | 0.0000 |
| $C_2$ | 0.0000 | 0.0000 |
| $C_4$ | $1.69490 \times 10^{-7}$ | $8.09490 \times 10^{-6}$ |
| $C_6$ | $-7.45650 \times 10^{-12}$ | $-4.49290 \times 10^{-8}$ |

TABLE 1-continued f = 8.75–127 mm
FNO = 1.72–2.13
2ω = 64.30°–4.96°

| $C_8$ | $8.91830 \times 10^{-15}$ | $4.64690 \times 10^{-10}$ |
|---|---|---|
| $C_{10}$ | 0.0000 | 0.0000 |

(d)
Values corresponding to equations 1 and 2 f4F = 35.04
f41 = 97.13
f43 = 287.28
f4F/f41 = 0.36
f4F/f43 = 0.12

Figure 2A:
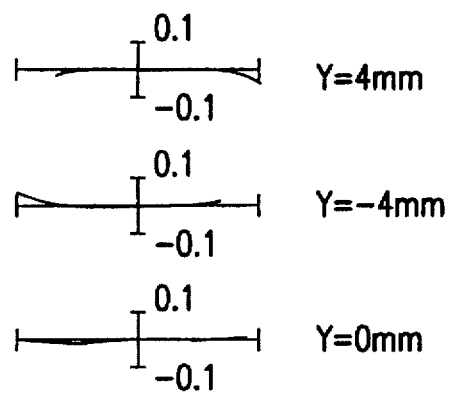
FIGS. 2(a)–(c) show lateral aberration diagrams which show lateral aberrations arising at three different focal length positions according to the first preferred embodiment when correction for the zoom lens movement is not performed.
Figure 2B:
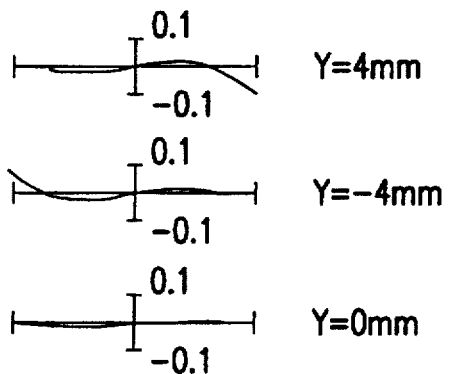
Figure 2C:
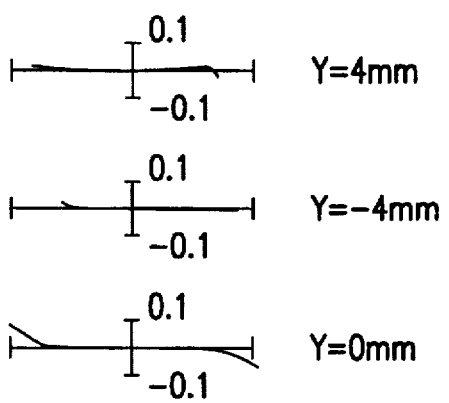
Figure 3A:
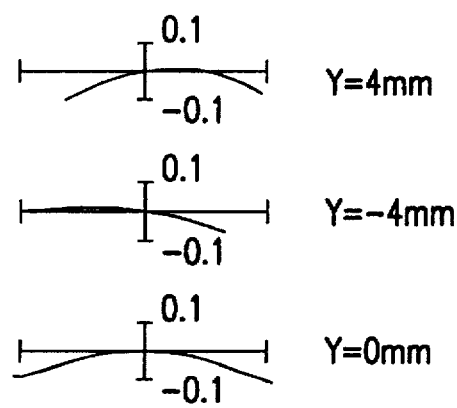
FIGS. 3(a)–(c) show lateral aberration diagrams which show lateral aberrations arising at three different focal length positions in the zoom lens of the first preferred embodiment when the positive meniscus lens L41 is eccentric and moved perpendicularly to the optical axis a distance of 1 mm.
Figure 3B:
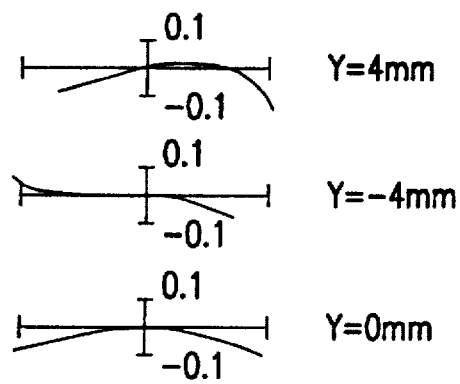
Figure 3C:
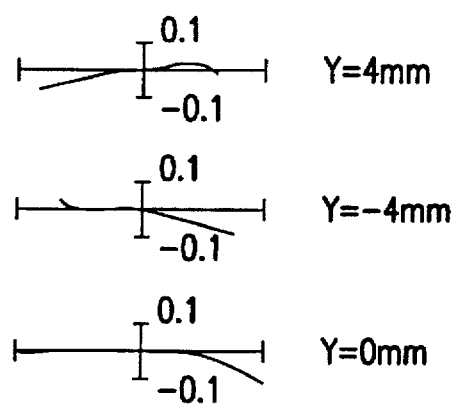
Figure 4A:
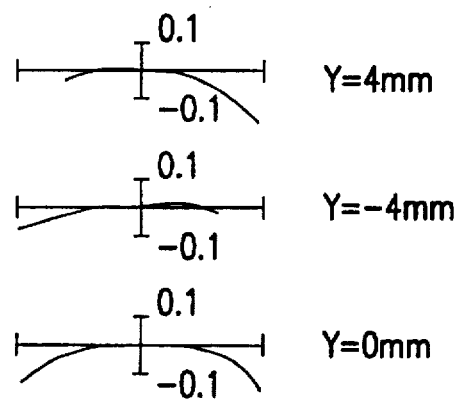
FIGS. 4(a)–(c) show lateral aberration diagrams which show lateral aberrations arising at three different focal length positions in the zoom lens of the first preferred embodiment when the compound positive lens L43 is eccentric and moved perpendicularly to the optical axis a distance of 1 mm.
Figure 4B:
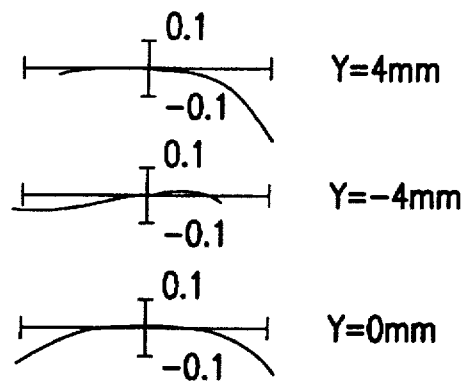
Figure 4C:
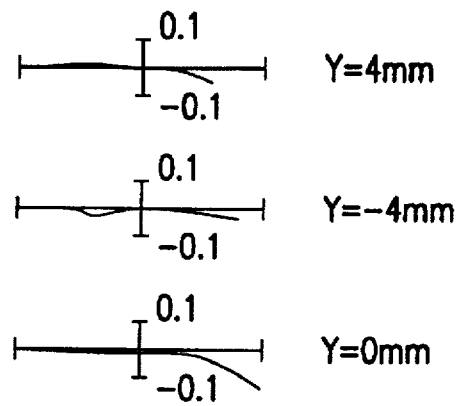

FIGS. 2(a)–(c) show lateral aberration diagrams for the three focal lengths indicated in Table 1(b) in the zoom lens 100 of the first preferred embodiment when image shifting is not performed. FIGS. 3(a)–(c) show lateral aberration diagrams for the three focal lengths in the zoom lens 100 of the first preferred embodiment when the positive meniscus lens L41 is eccentric and offset perpendicularly from the optical axis a distance of 1 mm. FIGS. 4(a)–(c) show lateral aberration diagrams for the three focal lengths in the zoom lens of the first preferred embodiment when the compound positive lens L43 is eccentric and offset perpendicularly from the optical axis a distance of 1 mm. FIGS. 2(a), 3(a) and 4(a) show the lateral aberration when the zoom lens 100 is in the wide-angle state, having a focal length f of 8.75 mm. FIGS. 2(b), 3(b) and 4(b) show the lateral aberration at an intermediate focal length state of the zoom lens, at a focal length f of 40 mm. FIGS. 2(c), 3(c) and 4(c) show the lateral aberration when the zoom lens 100 is in the telephoto state, having a focal length f of 127 mm.

In each aberration diagram, Y indicates the height of the image. The maximum image height Ymax is 5.5 mm. The lateral aberration is a value that corresponds to the d-line (λ=587.6 nm). Each lateral aberration diagram clearly shows that the lateral aberrations are properly corrected for when image shifting to correct for movement of the image position caused by movement of the zoom lens 100.

Figure 5:
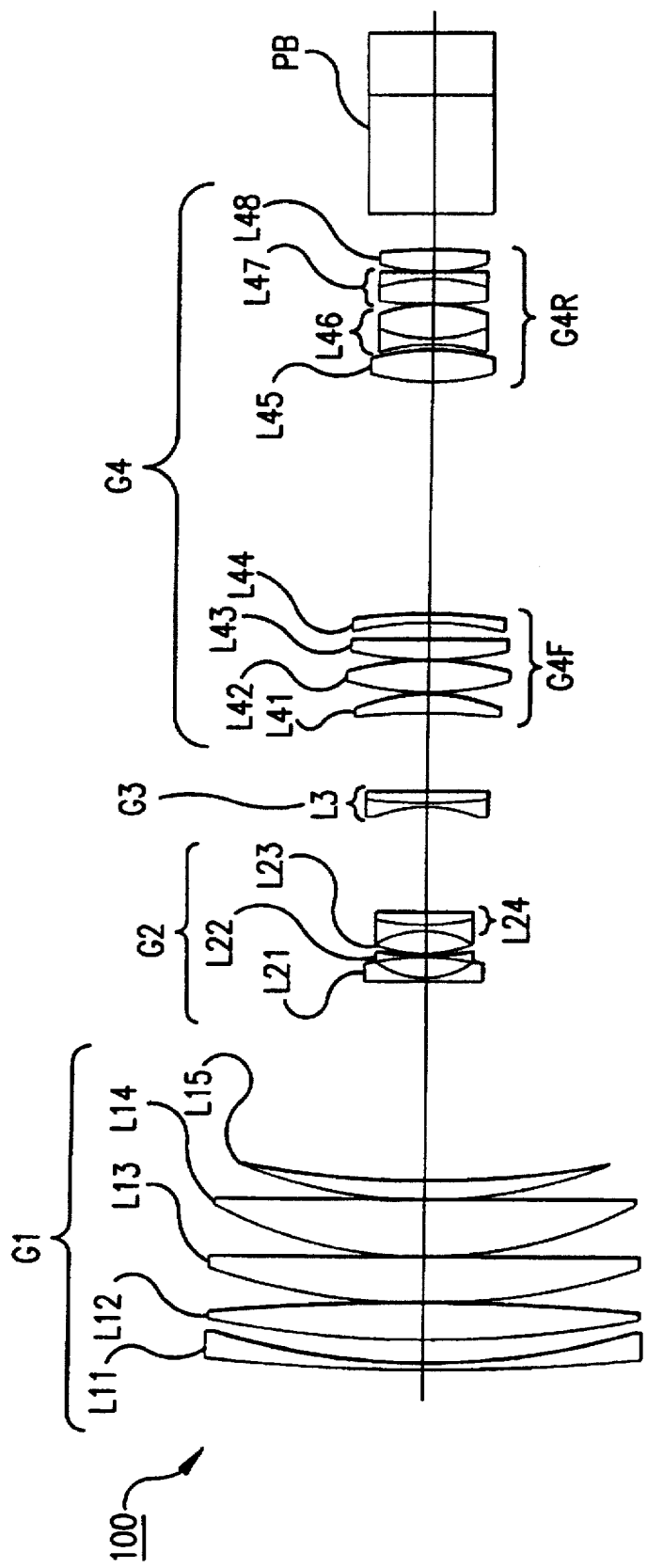
FIG. 5 shows a second preferred embodiment of the zoom lens according to this invention.

FIG. 5 shows the second embodiment of the zoom lens 100. As described above, the zoom lens 100 comprises a first lens group G1, a second lens group G2, a third lens group G3, and a fourth lens group G4.

In the second preferred embodiment, the first lens group G1 comprises a negative meniscus lens L11 having its convex surface on the object side, a biconvex lens L12, a positive meniscus lens L13 having its convex surface on the object side, a positive meniscus lens L14 having its convex surface on the object side, and a positive meniscus lens L15 having its convex surface on the object side. The second lens group G2 comprising a negative meniscus lens L21 having its convex surface on the object side, a biconcave lens L22, a biconvex lens L23, and a compound lens L24 comprising a biconcave lens and a positive meniscus lens having its convex surface on the object side. The third lens group G3 comprises a compound lens L3 comprising a biconcave lens and a biconvex lens. The fourth lens group G4 comprises the front lens group G4F and the rear lens group G4R. The front lens group G4F comprises a positive meniscus lens L41 having its concave surface on the object side, a biconvex lens L42, a positive meniscus lens L43 having its convex side on the object side, and a negative meniscus lens L44 having its concave surface on the object side. The rear lens group G4R comprises a biconvex lens L45, a compound lens L46 comprising a biconcave lens and a biconvex lens, a compound lens L47 comprising a biconvex lens and a biconcave lens, and a biconvex lens L48.

FIG. 5 shows the relative positions of the lens groups G1–G4 when the zoom lens 100 is in the wide-angle state. When the magnification is changed to place the zoom lens 100 in the telephoto state, the second lens group G2 is moved along the optical axis in a first direction, while the third lens group G3 is moved along the optical axis in the opposite direction. The positive meniscus lens L41, which is the positive lens of the front group G4F and which is closest to the object side, or the positive meniscus lens L43, which is the positive lens closest to the image side, is driven by the moving device 200 substantially perpendicularly to the optical axis to correct for movement of the image position caused by movement of the zoom lens 100.

The values of the parameters of the second preferred embodiment are displayed in Table 2. In Table 2, f is the focal length, FNo is the F-number, 2ω is the field angle, Surface Number is the lens surface number starting from the object side, r is the radius of curvature of each pair of adjacent lens surfaces, d is the space between each lens surface, and n and ν show the refractive indices and Abbe's numbers for the d-line ($\lambda$=587.6 nm).

As shown in FIG. 5, a prism block PB that indicates a parallel surface plate with a color separating prism, various filters, or the like, is positioned between the last lens surface and the image surface. Since the aberration corrections include this prism block PB, the values of the items of the prism block PB are included in Table 2.

TABLE 2 f = 10.3–300 mm
FNO = 2.00–3.00
2ω = 56.20°–2.10°
zoom ratio: V = 29.19

(a)

| Surface Number | r | d | ν | n |
|---|---|---|---|---|
| 1 | 380.001 | 1.90 | 28.4 | 1.79504 |
| 2 | 160.349 | 5.70 | | |
| 3 | 296.663 | 9.00 | 95.0 | 1.43875 |
| 4 | −395.439 | 0.10 | | |
| 5 | 130.085 | 11.00 | 95.0 | 1.43875 |
| 6 | 1109.849 | 0.10 | | |
| 7 | 96.618 | 13.00 | 95.0 | 1.43875 |
| 8 | 536.847 | 0.10 | 95.0 | 1.43875 |
| 9 | 96.599 | 7.00 | 95.8 | 1.43875 |
| 10 | 193.718 | (d10 is variable) | | |
| 11 | 258.595 | 0.90 | 35.7 | 1.90265 |
| 12 | 21.335 | 4.95 | | |
| 13 | −60.266 | 0.90 | 35.7 | 1.90265 |
| 14 | 81.001 | 0.10 | | |
| 15 | 33.286 | 5.90 | 30.8 | 1.61750 |
| 16 | −24.073 | 0.40 | | |
| 17 | −22.395 | 0.90 | 52.3 | 1.74810 |
| 18 | 35.000 | 3.40 | 23.0 | 1.86074 |
| 19 | 177.230 | (d19 is variable) | | |
| 20 | −39.766 | 0.90 | 40.9 | 1.79631 |
| 21 | 76.000 | 3.40 | 23.0 | 1.86074 |
| 22 | −354.595 | (d22 is variable) | | |
| 23 | −127.553 | 4.80 | 82.5 | 1.49782 |
| 24 | −39.111 | 0.10 | | |
| 25 | 65.525 | 8.50 | 70.4 | 1.48749 |
| 26 | −76.695 | 0.10 | | |
| 27 | 69.759 | 5.40 | 65.8 | 1.46450 |
| 28 | 721.009 | 4.10 | | |
| 29 | −67.590 | 1.80 | 35.7 | 1.90265 |
| 30 | −200.872 | 58.96 | | |
| 31 | 49.120 | 7.10 | 65.8 | 1.46450 |

TABLE 2-continued f = 10.3–300 mm
FNO = 2.00–3.00
2ω = 56.20°–2.10°
zoom ratio: V = 29.19

| | | | | |
|---|---|---|---|---|
| 32 | −59.382 | 0.70 | | |
| 33 | −82.802 | 1.50 | 39.8 | 1.86994 |
| 34 | 33.499 | 8.30 | 65.8 | 1.46450 |
| 35 | −43.838 | 0.10 | | |
| 36 | 92.920 | 6.50 | 37.0 | 1.61293 |
| 37 | −32.796 | 1.50 | 39.8 | 1.86994 |
| 38 | 189.781 | 0.10 | | |
| 39 | 36.269 | 5.80 | 65.8 | 1.46450 |
| 40 | −138.037 | 10.00 | | |
| 41 | ∞ | 30.00 | 38.1 | 1.60342 |
| 42 | ∞ | 16.20 | 64.1 | 1.51680 |
| 43 | ∞ | 1.23 | | |

(b)
d vs. focal length for variable spacing

| | focal length (f) | | |
|---|---|---|---|
| d (Surface No.) | 10.30 | 120.00 | 300.00 |
| (10) | 0.9381 | 70.1700 | 78.0198 |
| (19) | 86.7028 | 7.8587 | 14.1760 |
| (22) | 10.4311 | 20.0432 | 5.8762 |

(c)
Values corresponding to equations
f1 = 111.36
f2 = −16.32
β2W = −0.17 f4F = 46.15
f41 = 111.30
f43 = 165.83
f4F/f41 = 0.41
f4F/f43 = 0.28

Figure 6A:
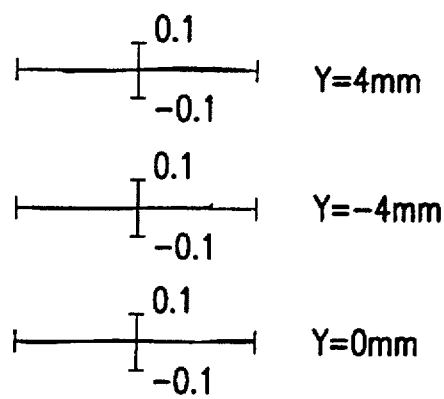
FIGS. 6(a)–(c) show lateral aberration diagrams which show lateral aberrations arising at three different focal length positions according to the second embodiment when correction for zoom lens movement is not performed.
Figure 6B:
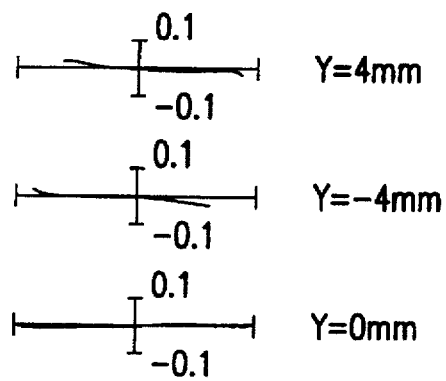
Figure 6C:
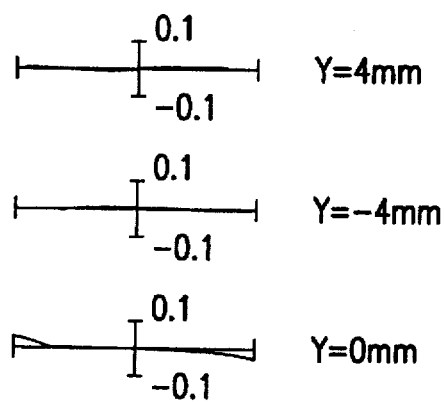
Figure 7A:
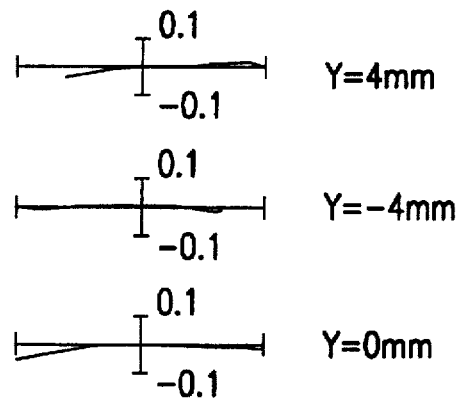
FIGS. 7(a)–(c) show lateral aberration diagrams which show lateral aberrations arising at three different focal length positions in the zoom lens of the second preferred embodiment when the positive meniscus lens L41 is eccentric and moved perpendicularly to the optical axis a distance of 1 mm.
Figure 7B:
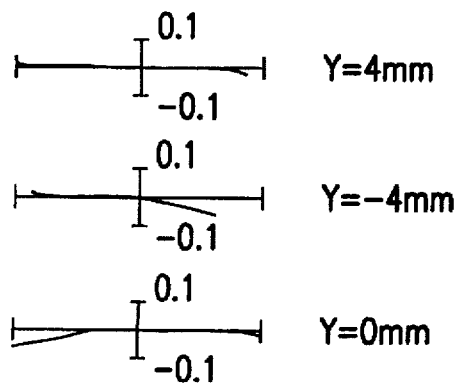
Figure 7C:
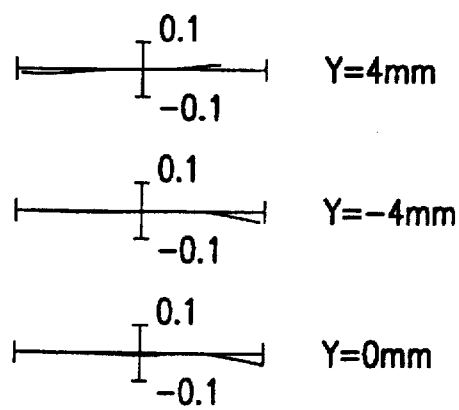
Figure 8A:
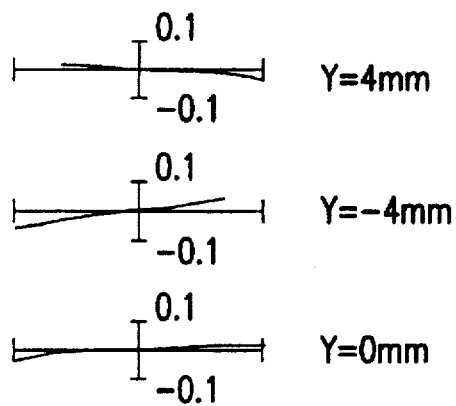
FIGS. 8(a)–(c) shows lateral aberration diagrams which show lateral aberrations arising at three different focal length positions in the zoom lens of the second preferred embodiment when the positive meniscus lens L43 is eccentric and moved perpendicularly to the optical axis a distance of 1 mm.
Figure 8B:
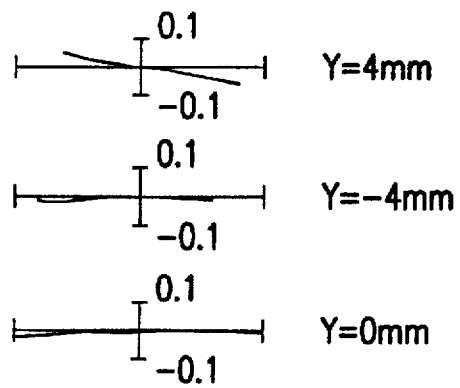
Figure 8C:
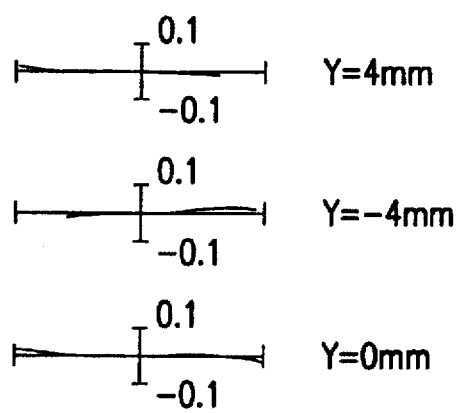

FIGS. 6(a)–(c) show lateral aberration diagrams for the three focal lengths indicated in Table 2(b) in the zoom lens 100 of the second preferred embodiment when image shifting is not performed. FIGS. 7(a)–(c) show lateral aberration diagrams for the three focal lengths in the zoom lens 100 of the second preferred embodiment when the positive meniscus lens L41 is eccentric and offset perpendicularly to the optical axis a distance of 1 mm. FIGS. 8(a)–(c) show lateral aberration diagrams for the three focal length condition in the zoom lens 100 of the second preferred embodiment when the positive meniscus lens L43 is eccentric and offset perpendicularly to the optical axis a distance of 1 mm. FIGS. 6(a), 7(a) and 8(a) show the lateral aberration when the zoom lens 100 is in the wide-angle state, having a focal length f of 10.3 mm. FIGS. 6(b), 7(b) and 8(b) show the lateral aberration when the zoom lens 100 is at an intermediate focal length f of 120 mm. FIGS. 6(c), 7(c) and 8(c) show the lateral aberration when the zoom lens 100 is in the telephoto state, having a focal length f of 300 mm.

In each aberration diagram, Y indicates the height of the image. The maximum image height Ymax is 5.5 mm. The lateral aberration is a value that corresponds to the d-line ($\lambda$=587.6 nm). Each lateral aberration diagram clearly shows that the lateral aberrations are properly corrected for when image shifting to correct for movement of the image position caused by movement of the zoom lens.

Figure 9:
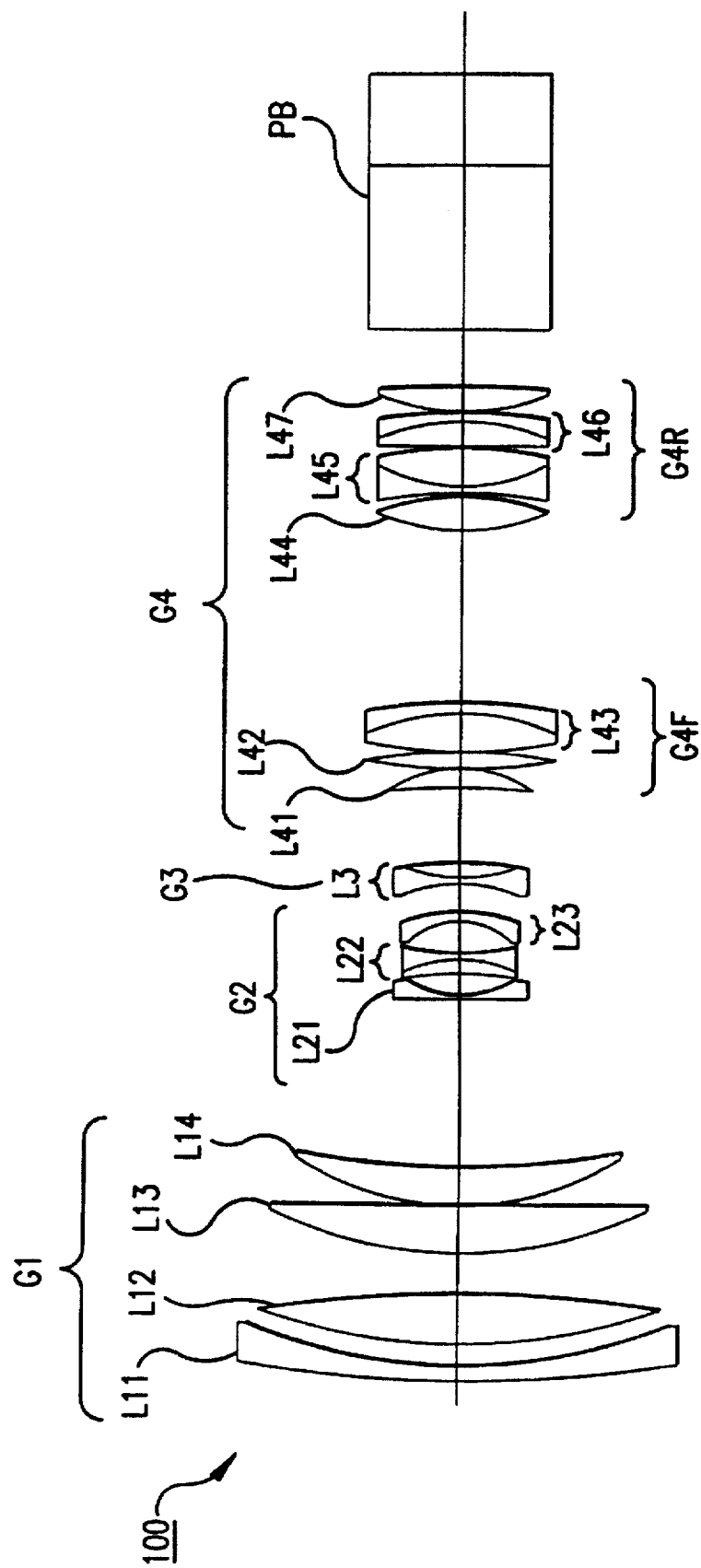
FIG. 9 shows a third preferred embodiment of the zoom lens according to this invention.

FIG. 9 shows the third embodiment of the zoom lens 100. As described above, the zoom lens 100 comprises the first lens group G1, the second lens group G2, a third lens group G3, and the fourth lens group G4.

In the third preferred embodiment, the first lens group G1 comprises a negative meniscus lens L11 having its convex surface on the object side, a biconvex lens L12, a biconvex lens L13, and a positive meniscus lens L14 having its convex surface on the object side. The second lens group G2 comprises a negative meniscus lens L21 having its convex surface on the object side, a compound lens L22 comprising a positive meniscus lens having its concave surface on the object side and a biconcave lens, and a negative meniscus lens L23 having its concave surface on the object side. The third lens group G3 comprises a compound lens L3 comprising a biconcave lens and a biconvex lens. The fourth lens group G4 comprises the front lens group G4F and the rear lens group G4R. The front lens group G4F comprises a positive meniscus lens L41 having its concave surface on the object side, a biconvex lens L42, and a compound positive lens L43 comprising a biconvex lens and a negative meniscus lens having its concave surface on the object side. The rear lens group G4R comprises a biconvex lens L44, a compound lens L45 comprising a biconcave lens and a biconvex lens, a compound lens L46 comprising a biconvex lens and a negative meniscus lens having its concave surface on the object side, and a biconvex lens L47.

FIG. 9 shows the relative positions of the lens groups G1–G4R when the zoom lens 100 is in the wide-angle state. When the magnification is changed to place the zoom lens in the telephoto state, the second lens group G2 is moved along the optical axis in a first direction, while the third lens group G3 is moved along the optical axis in the opposite direction. The positive meniscus lens L41, which is the positive lens of the front lens group G4F and which is closest to the object side, or the compound positive lens L43, which is the positive lens closest to the image side, is driven by the moving device 200 in a direction substantially perpendicularly to the optical axis to correct for movement of the image position caused by movement of the zoom lens 100.

The values of the parameters of the third preferred embodiment are displayed in Table 3. In Table 3, f is the focal length, FNo is the F-number, 2ω is the field angle, Surface Number is the lens surface number starting from the object side, r is the radius of curvature of each lens surface, d is the space between each pair of adjacent lens surfaces, and n and ν show the refractive indices and Abbe's numbers for the d-line (λ=587.6 nm).

As shown in FIG. 9, a prism block PB, that indicates a parallel surface plate with a color separating prism, various filters, or the like, is positioned between the last lens surface and the image surface. Since the aberration corrections include this prism block PB, the values of the items of the prism block PB are included in Table (3).

TABLE 3 f = 8.75–127 mm
FNO = 1.72–2.25
2ω = 64.30°–4.96°

(a)

| Surface Number | r | d | ν | n |
|---|---|---|---|---|
| 1 | 259.230 | 1.90 | 25.4 | 1.80518 |
| 2 | 75.039 | 4.14 | | |
| 3 | 104.757 | 9.80 | 95.0 | 1.43875 |
| 4 | −226.292 | 7.14 | | |
| 5 | 69.155 | 9.60 | 67.9 | 1.59319 |
| 6 | −1405.961 | 0.10 | | |
| 7 | 49.204 | 7.20 | 67.9 | 1.59319 |
| 8 | 146.521 | (d8 = variable) | | |
| 9 | 219.850 | 0.90 | 35.8 | 1.90265 |
| 10 | 12.126 | 5.15 | | |

TABLE 3-continued f = 8.75–127 mm
FNO = 1.72–2.25
2ω = 64.30°–4.96°

| 11 | −37.160 | 2.30 | 23.0 | 1.86074 |
|---|---|---|---|---|
| 12 | −20.023 | 1.05 | 52.3 | 1.74810 |
| 13* | 34.027 | 0.10 | | |
| 14 | 27.063 | 6.50 | 30.8 | 1.61750 |
| 15 | −12.377 | 1.00 | 43.3 | 1.84042 |
| 16 | −35.592 | (d16 = variable) | | |
| 17 | −25.915 | 0.90 | 46.4 | 1.80411 |
| 18 | 46.251 | 2.45 | 23.0 | 1.86074 |
| 19 | −218.446 | (d19 = variable) | | |
| 20 | −64.851 | 2.65 | 65.8 | 1.46450 |
| 21 | −30.855 | 0.10 | | |
| 22 | 63.447 | 3.85 | 65.8 | 1.46450 |
| 23 | −121.631 | 0.10 | | |
| 24 | 55.649 | 7.55 | 65.8 | 1.46450 |
| 25 | −35.301 | 1.70 | 43.3 | 1.84042 |
| 26 | −81.021 | 35.65 | | |
| 27 | 36.304 | 6.40 | 65.8 | 1.46450 |
| 28 | −55.538 | 0.70 | | |
| 29 | −78.120 | 1.50 | 39.8 | 1.86994 |
| 30 | 27.413 | 7.20 | 65.8 | 1.46450 |
| 31 | −52.585 | 0.10 | | |
| 32 | 204.963 | 5.30 | 54.6 | 1.51454 |
| 33 | −27.126 | 1.50 | 39.8 | 1.86994 |
| 34 | −81.659 | 0.10 | | |
| 35 | 29.462 | 4.60 | 65.8 | 1.46450 |
| 36 | −957.332 | 10.00 | | |
| 37 | ∞ | 30.00 | 38.1 | 1.60342 |
| 38 | ∞ | 16.20 | 64.1 | 1.51680 |
| 39 | ∞ | 1.32 | | |

(b)
d vs. focal length for variable spacing

| | focal length (f) | | |
|---|---|---|---|
| d (Surface No.) | 8.75 | 40.00 | 127.00 |
| (8) | 0.6978 | 30.2975 | 39.7454 |
| (16) | 39.2759 | 5.5981 | 3.7092 |
| (19) | 7.5525 | 11.6305 | 4.0715 |

(c)
Non-spherical surface data

Surface Number
2

| k | 0.0000 |
|---|---|
| $C_2$ | 0.0000 |
| $C_4$ | $-2.73190 \times 10^{-5}$ |
| $C_6$ | $-1.31870 \times 10^{-8}$ |
| $C_8$ | $-6.34980 \times 10^{-10}$ |
| $C_{10}$ | 0.0000 |

(d)
Values corresponding to equations 1 and 2 f4F = 37.18
f41 = 123.66
f43 = 123.45
f4F/f41 = 0.30
f4F/f43 = 0.30

Figure 10A:
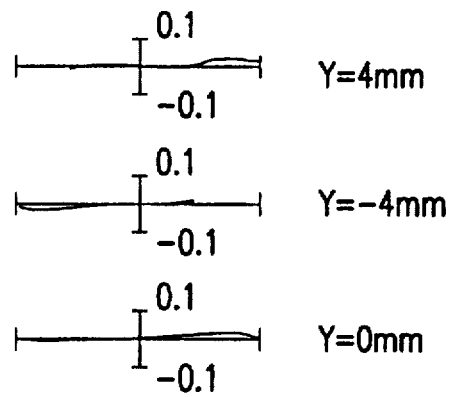
FIGS. 10(a)–(c) show lateral aberration diagrams which show lateral aberrations arising at three different focal length positions according to the third embodiment when correction for zoom lens movement is not performed.
Figure 10B:
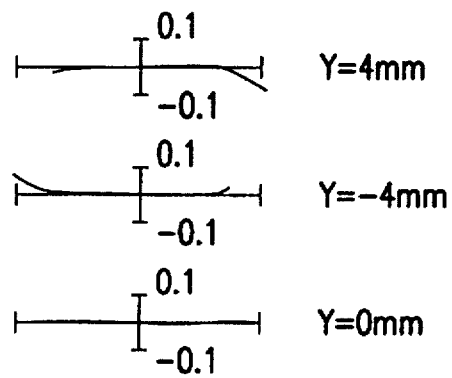
Figure 10C:
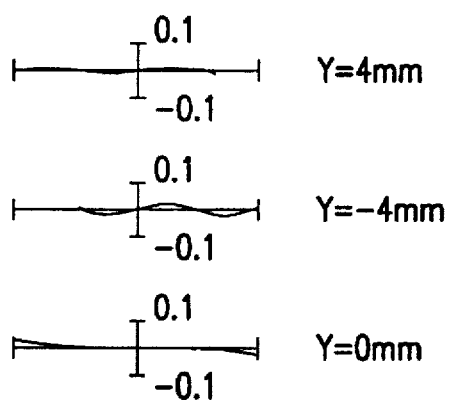
Figure 11A:
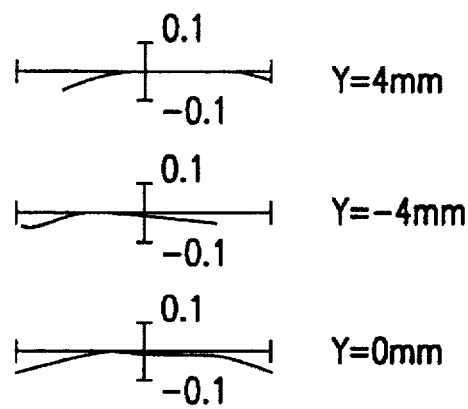
FIGS. 11(a)–(c) shows lateral aberration diagrams which show lateral aberrations arising at three different focal length positions in the zoom lens of the third preferred embodiment when the positive meniscus lens L41 is eccentric and moved perpendicularly to the optical axis a distance of 1 mm.
Figure 11B:
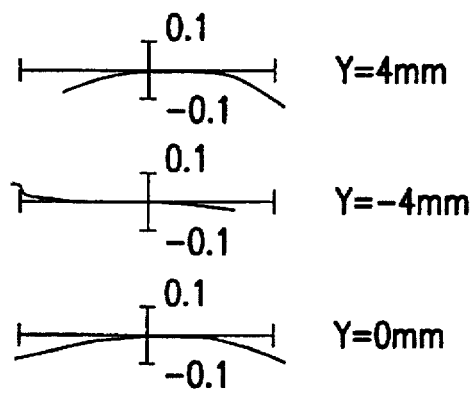
Figure 11C:
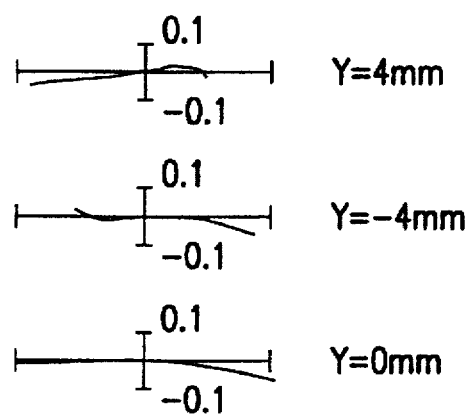
Figure 12A:
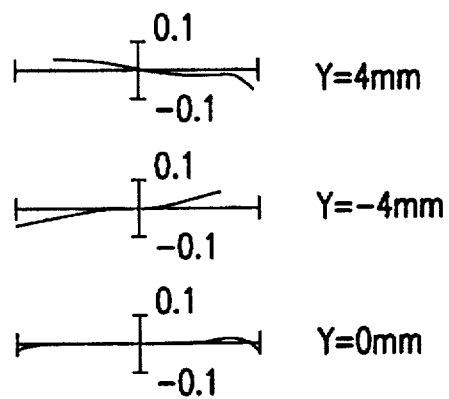
FIGS. 12(a)–(c) shows lateral aberration diagrams which show lateral aberrations arising at three different focal length positions in the zoom lens of the third preferred embodiment when the compound positive lens L43 is eccentric and moved perpendicularly to the optical axis a distance of 1 mm.
Figure 12B:
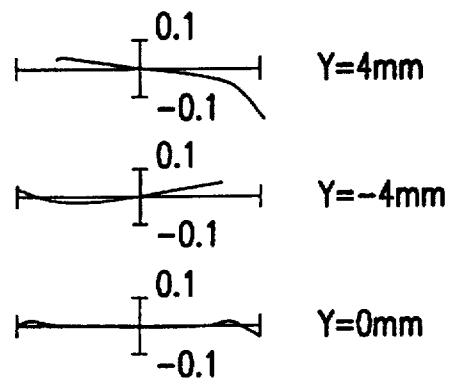
Figure 12C:
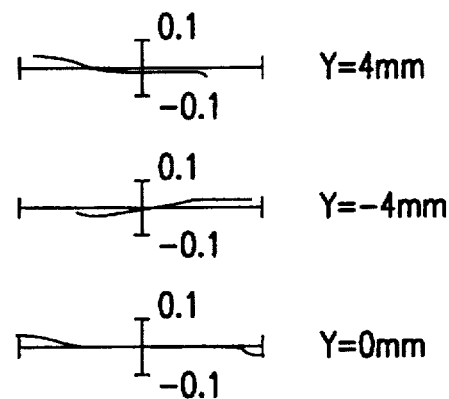

FIGS. 10(a)–(c) show lateral aberration diagrams for the three focal lengths indicated in Table 3(b) in the zoom lens 100 of the third preferred embodiment when image shifting is not performed. FIGS. 11(a)–(c) show lateral aberration diagrams for the three focal lengths in the zoom lens 100 of the third preferred embodiment when the positive meniscus lens L41 is made eccentric and offset perpendicularly to the optical axis a distance of 1 mm. FIGS. 12(a)–(c) show lateral aberration diagrams for the three focal lengths in the zoom lens 100 of the third preferred embodiment when the compound positive lens L43 is made eccentric and offset perpendicularly to the optical axis a distance of 1 mm.

FIGS. 10(a), 11(a) and 12(a) show the lateral aberration when the zoom lens 100 is in the wide-angle state, having a focal length f of 8.75 mm. FIGS. 10(b), 11(b) and 12(b) show the lateral aberration when the zoom lens 100 is at an intermediate focal length of 40 mm. FIGS. 10(c), 11(c) and 12(c) show the lateral aberration when the zoom lens 100 is in the telephoto state having a focal length f of 127 mm.

In each aberration diagram, Y indicates the height of the image. The maximum image height Ymax is 5.5 mm. The lateral aberration is a value that corresponds to the d-line ($\lambda$=587.6 nm). Each lateral aberration diagram clearly shows that the lateral aberrations are properly corrected for when image shifting to for correct movement of the image position caused by movement of the zoom lens.

As described above, according to this invention, the front lens group of the fourth lens group G4, which remains stationary along the optical axis when the magnification is changed and when focusing, is driven in a direction substantially perpendicular to the optical axis to correct for shifting of the image position caused by movement of the zoom lens 100. Therefore, control of the moving device of the zoom lens 100 for the image shifting lens or lens group is uncomplicated and allows the camera to compose a good image even when movement of the zoom lens 100 occurs.

While this invention has been described in conjunction with specific embodiments, it is evident that many alternatives, modifications and variations will be apparent to those skilled in the art. Accordingly, the preferred embodiments of the invention as set forth above are intended to be illustrative, and not limiting various changes may be made to the zoom lens of this invention without departing from the spirit and scope of the invention as defined in the following claims.

What is claimed is:

1. A zoom lens having an optical axis, comprising:
   a first lens group having positive refractive power;
   a second lens group having negative refractive power;
   a third lens group having negative refractive power; and
   a fourth lens group having positive refractive power and comprising a front lens group and a rear lens group, said front lens group of the fourth lens group having positive refractive power, and said rear lens group of the fourth lens group having positive refractive power, the front lens group of the fourth lens group including at least three positive lens components, and
   wherein among said at least three positive lens components in the front lens group of the fourth lens group, a lens component positioned closest to an image side moves in a direction substantially perpendicular to the optical axis to correct for movement of an image position caused by movement of the zoom lens.

2. The zoom lens according to claim 1, further comprising moving device coupled to the lens component positioned closest to the image side, the moving device capable of moving the lens component positioned closest to the image side in the direction substantially perpendicular to the optical axis.

3. The zoom lens according to claim 2, wherein the moving device comprises:
   a driving device coupled to the lens component positioned closest to the image side, the driving device capable of moving the lens component positioned closest to the image side in the direction substantially perpendicular to the optical axis;
   a movement detection device for detecting movement of the zoom lens; and
   a controller coupled to the driving device and the movement detection device and controlling the driving device based on the detected movement of the zoom lens.

4. The zoom lens according to claim 1, wherein the first through fourth lens groups are arranged in order extending from an object side of the zoom lens closest to an object to be photographed to an image side of the zoom lens closest to an image plane.

5. The zoom lens according to claim 1, wherein the zoom lens satisfies:

$$0.1 < f4F/f41 < 0.5$$

where:
   f4F is a focal length of the front lens group of the fourth lens group, and
   f41 is a focal length of the lens of the front lens group closest to an object side.

6. The zoom lens according to claim 5, wherein the zoom lens further satisfies:

$$0.1 < f4F/f43 < 0.5$$

where f43 is a focal length of the lens of the front lens group closest to an image side.

7. The zoom lens according to claim 1, wherein the zoom lens satisfies:

$$0.1 < f4F/f43 < 0.5$$

where:
   f4F is a focal length of the front lens group of the fourth lens group, and
   f43 is a focal length of the lens of the front lens group closest to an image side.

8. The zoom lens according to claim 1, wherein the first lens group and at least the front lens group of the fourth lens group remain stationary along the optical axis and the second and third lens groups are moved along lens.

9. The zoom lens according to claim 8, wherein the optical axis to change a magnification of the zoom when the second lens group is moved in a first direction along the optical axis, the third lens group is moved in a direction opposite to the first direction along the optical axis to change the magnification of the zoom lens.

10. The zoom lens according to claim 9, wherein the zoom lens satisfies:

$$0.5 < (FT)^{1/2} * f1/fT < 0.9$$

where:
   FT is a F-number when the zoom lens is in a telephoto state,
   f1 is a focal length of the first lens group, and
   fT is a combined focal length of the zoom lens when the zoom lens is in the telephoto state.

11. The zoom lens according to claim 1, wherein the zoom lens satisfies:

$$0.9 < |\beta 2W * V^{1/2}| < 1.3$$

where:

β2W is a magnification of the second lens group when the zoom lens is in a wide-angle state, and V is a zoom ratio of the zoom lens when the zoom lens is in the wide-angle state.

12. A zoom lens having an optical axis, comprising:

first lens means for providing positive refractive power;

second lens means for providing negative refractive power;

third lens means for providing negative refractive power;

fourth lens means for providing positive refractive power, the fourth lens means comprising (1) front lens means that includes at least three lenses each of which has positive refractive power, and (2) rear lens means; and lens moving means for moving a lens of the at least three lenses that is closest to an object side of the zoom lens in a direction substantially perpendicular to the optical axis to correct for movement of an image position caused by movement of the zoom lens.

13. The zoom lens according to claim 12, further comprising:

drive means coupled to the fourth lens means for driving the lens of the at least three lenses that is closest to an object side in the direction substantially perpendicular to the optical axis;

movement detection means for detecting movement of the zoom lens; and control means coupled to the drive means and the movement detection means for controlling the drive means based on the detected movement of the zoom lens.

14. The zoom lens according to claim 12, wherein the zoom lens satisfies:

$$0.1 < f4F/f41 < 0.5$$

where:

f4F is a focal length of the front lens means of the fourth lens means, and f41 is a focal length of the lens closest to the object side of the front lens means.

15. The zoom lens according to claim 12, wherein the zoom lens satisfies the following condition:

$$0.1 < f4F/f43 < 0.5$$

where:

f4F is a focal length of the front lens means of the fourth lens means, and f43 is a focal length of a lens of the at least three lenses closest to an image side of the front means.

16. The zoom lens according to claim 12, wherein the first through fourth lens means are arranged in order extending from an object side of the zoom lens closest to an object to be photographed to an image side of the zoom lens closest to an image plane.

17. The zoom lens according to claim 12, wherein the first lens means and at least the front lens means of the fourth lens means remain stationary along the optical axis and said second and third lens means are moved along the optical axis to change a magnification of the zoom lens.

18. The zoom lens according to claim 17, wherein said second lens means is moved in a first direction along the optical axis and said third lens means is moved in a direction opposite the first direction along the optical axis to change the magnification of the zoom lens.

19. The zoom lens according to claim 12, wherein the zoom lens satisfies:

$$0.5 < FT^{1/2} * f1/fT < 0.9$$

where:

FT is a F-number when the zoom lens is in a telephoto state, f1 is a focal length of the first lens means, and fT is a combined focal length of the zoom lens when the zoom lens is in the telephoto state.

20. The zoom lens according to claim 12, wherein the zoom lens satisfies the following condition:

$$0.9 < \beta 2W * V^{1/2} < 1.3$$

where:

β2W is a magnification of the second lens means when the zoom lens is in a wide-angle state, and V is a zoom ratio of the zoom lens when the zoom lens is in the wide-angle state.

* * * * *